April 14, 1970 K. H. WEBER ET AL 3,506,385

PHOTOFLASH LAMP

Filed Feb. 23, 1968

Inventors:
Kurt H. Weber
George W. Cressman
by Richard H. Burgess
Their Attorney 3,506,385
PHOTOFLASH LAMP
Kurt H. Weber, Pepper Pike, and George W. Cressman, Chagrin Falls, Ohio, assignors to General Electric Company, a corporation of New York
Filed Feb. 23, 1968, Ser. No. 707,672
Int. Cl. F21k 5/02
U.S. Cl. 431—95
11 Claims

ABSTRACT OF THE DISCLOSURE

A miniature photoflash lamp is provided with certain borosilicate glasses, which seal well to iron-nickel-cobalt alloy electrical inlead materials used for the lamp envelope. Such lamps can be made practically with a light output of at least about 12,500 lumen-seconds per cubic centimeter of internal lamp volume. Compared to the prior art, these glasses permit greater loading of the lamp with combustible material and oxidizer, resulting in greater light output per unit volume of the lamp with at least as good containment of the lamp upon flashing. A beneficial fracture mechanism of the glass is observed.

BACKGROUND OF THE INVENTION

The present invention relates to miniature photoflash lamps generally of the all-glass type. More particularly, in certain embodiments it relates to such lamps which have a filling of filamentary combustible material and oxygen at high pressures.

In the commercial products known as the AG-1, AG-3 and flashcube photoflash lamps, the prior art has reached plateaus of performance beyond which it has been difficult to progress in terms of higher light output per unit volume of the photoflash lamp. Although some previous studies have resulted in predictions that it would be possible to produce photoflash lamps with light-producing ability considerably above the approximate 6500 lumen-seconds per cubic centimeter of internal volume (lmsec./cc.) of the AG-1, 8800 lmsec./cc. of the flashcube lamp, and 9000 lmsec./cc. of the AG-3, such studies heretofore have not borne fruit in terms of commercially feasible products. A major reason for the unavailability of lamps improved beyond this point has been the lack of suitable lamp designs and materials.

Also, it has been assumed by many skilled in the art that present-day photoflash lamps cannot be greatly improved upon because they operate near the maximum theoretical color temperature for the combustion of zirconium and approximate black-body radiators. Actually, a flash lamp using filamentary combustible material is not a complete black-body radiator until the combustible material fills the entire apparent cross section of the lamp while at its maximum temperature, a condition which is far from realized in current commercial lamps. Thus, the theoretical limit in light output per unit volume according to this reasoning has not yet been approached.

The AG-1 lamp is described and claimed in Patent 2,982,119—R. M. Anderson, and a method for its production in Patent 3,188,162—R. M. Anderson and L. A. Demchock, Jr. The AG-3 lamp is the subject of Patent 3,304,750—R. M. Anderson. These patents are assigned to the assignee of the present application.

To increase light production per unit volume of a photoflash lamp, heavier loadings of combustible filamentary material such as shredded zirconium foil can be used accompanied by suitable increases in quantity of oxygen in the lamp. However, this leads to increased difficulty of both static containment and dynamic containment upon flashing of the lamp. The plastic coatings enclosing glass photoflash lamps are effective in containing lamps of the prior art even though the glass lamp wall often does break into many pieces due to thermal shock, impact from hot particles of metal and oxide, and other phenomena accompanying the flashing of the lamp. At higher pressures, it becomes more difficult to contain the glass.

Although quartz and other high silica glasses such as Vycor and certain Pyrex glasses have been suggested for photoflash lamp envelopes for containing higher pressure, some of these materials are quite expensive and difficult to work due to high softening temperatures and other properties. Some such glasses often require that lead-in wires to be sealed through them be molybdenum, tungsten or other materials generally less desirable for outer lead wires of photoflash lamps than certain other metals due to their high rigidity, brittleness, and cost. Also, seals with certain glass-metal combinations can be difficult to produce and can have undesirably low reliability when made by high speed, low cost production techniques.

SUMMARY OF THE INVENTION

It is an object of the present invention to provide miniature high performance photoflash lamps made from materials which exhibit far more satisfactory performance in various ways than the prior art, including more reliable sealing and a less limiting mechanism of fracture of the glass envelope or wall of the lamp upon flashing of the lamp. A further object is to provide greatly improved and more practical miniature photoflash lamps of considerably smaller size and higher performance than those currently commercially available, and indeed with a greater improvement in light output per unit volume than has been achieved in the entire previous history of photoflash lamps.

Briefly stated, the present invention in certain of its embodiments comprises an improved photoflash lamp having a volume of less than about two cubic centimeters and comprising: a hermetically sealed envelope, and within said envelope ignition means, an oxidizing atmosphere at a pressure of at least several atmospheres, such as between eight and twenty and preferably at least twelve atmospheres, and filamentary combustible material, said filamentary combustible material preferably being a metal or alloy having an oxide with a melting point above about 2200° C. The envelope of the lamp is composed of a glass consisting essentially of the following constituents in about the ranges stated by weight: 60 to 75% $SiO_2$, 10 to 25% $B_2O_3$, 1 to 10% $Al_2O_3$, 4 to 10% total alkali oxides preferably selected from Na, K, and Li oxides, and 0 to 5% BaO, except for incidental impurities and residual fluxes and refining agents such as $As_2O_3$ and having a mean coefficient of linear thermal expansion between 0 and 300° C.$\times 10^{-7}$ per ° C. ($\alpha$) about in the range of 40 to 50. Percentages herein are by weight, except where indicated otherwise. The lamp preferably contains the filamentary combustible material in an amount at least about 80 molar percent of the amount required to form a stable stoichiometric compound with the oxidizing atmosphere in the lamp. Lamps of the invention can be made with a light output of at least about 12,500 lmsec./cc. of internal lamp volume. The mean deviation of light output in lmsec. of photoflash lamps can be as much as ±5%.

The best improvements in the lamps of the present invention seem to result when the glass of the envelope is selected so that a substantial mode of fracture of the glass envelope on flashing of said photoflash lamp is by spalling off or "shaling" of layers of parts of the internal surface of said glass envelope at the loci of impingement of combustion residues such as hot metal and oxide, thereby minimizing and delaying the formation and propagation of cracks into and penetrating through the thickness of the glass envelope.

Although the present invention has advantages for moderately loaded lamps, its greatest benefits are realized in highly loaded lamps such as with oxygen pressures over about eight atmospheres. Such lamps can have zirconium combustible materials, preferably in amounts of at least 45 milligrams per cubic centimeter of lamp volume. Although the invention permits the production of lamps with over 12,500 lmsec./cc., it can also have advantages for less efficient lamps, particularly in the case of smaller lamps.

Certain more preferable glass composition ranges comprise: 60 to 75% silica, 14 to 22% boric oxide, 3 to 9% alumina, 4 to 10% total alkali oxides, and 0 to 5% barium oxide, having an $\alpha$ about in the range of 45 to 50.

Lamps of the present invention are preferably provided with at least one electrical inlead hermetically sealed through said glass wall. Suitable alloys for such inleads through the borosilicate hard glasses of the invention include those known by the names Kovar, Rodar, Therlo, Fernico I, Fernico II, Nicoseal, Nilok, Sealvac A, and others. Generally, these are alloys predominantly of iron, nickel and cobalt, and optionally contain manganese in amounts generally less than 1%, preferably less than 0.5%, along with incidental impurities. The general range of compositions of such alloys is 27 to 32% Ni, 14 to 19% Co, less than 1.0% Mn, the balance iron, except for incidental impurities. The composition of Kovar, a suitable lead material, is about 54% Fe, 29% Ni, 17% Co, <0.5% Mn, <0.2% Si, and <0.06% C.

Specifically preferred glass compositions for the glass envelope of lamps of the invention are approximately: 21% $B_2O_3$, 8.4% $Al_2O_3$, 3% BaO, 2.3% $Na_2O$, 2.4% $K_2O$, 0.5% $Li_2O$, and the balance $SiO_2$, having an $\alpha$ of about 47, known commercially as 7052 glass; another of 15% $B_2O_3$, 3.5% $Al_2O_3$, 7 to 7.5% $Na_2O$, 1.2% $K_2O$, 1% BaO, 0.3% F, 0.3% $Sb_2O_3$, and the balance $SiO_2$, having an $\alpha$ of about 51, herein referred to as 706xl glass. Essentially equivalent narrow composition ranges for these glasses are: glass 7052—60 to 65% $SiO_2$, 19 to 23% $B_2O_3$, 8 to 9% $Al_2O_3$, 4.5 to 5.5% total alkali oxides, and 2 to 4% BaO; glass 706xl—68 to 73% $SiO_2$, 13 to 17% $B_2O_3$, 2 to 4.5% $Al_2O_3$, 7 to 9% total alkali oxides, and 0 to 2% BaO.

Further preferred embodiments of the invention include lamps in which the electrical inleads are sealed through thickened areas of the lamp wall or through a pressed powder glass preform which has been fused to said inleads and to the lamp envelope, thereby forming smooth fusion seals without sharp stress raisers. The glass preform operates to terminate further propagation of cracks which form in or move into the seal region of the lamps.

A definitive measurement which distinguishes certain aspects of the invention from the prior art is a statistical measurement of the time from commencement of flashing until fracture penetrating through the glass as detectable by noise. A random sampling of lamps according to the present invention when tested for time to noise will show such noise of glass fracture penetrating the envelope normally in less than 12%, and essentially always in less than 15% of the lamps during the initial 100 milliseconds after initiation of flashing. Prior art commercial lamps show noise of glass fracture penetration of the envelope in 90% of the lamps during the initial 100 milliseconds after initiation of flashing. Thus, the time to penetrating fracture is shifted to substantially later times than for prior art commercial lamps.

DESCRIPTION OF THE PREFERRED EMBODIMENTS

Figure 1:
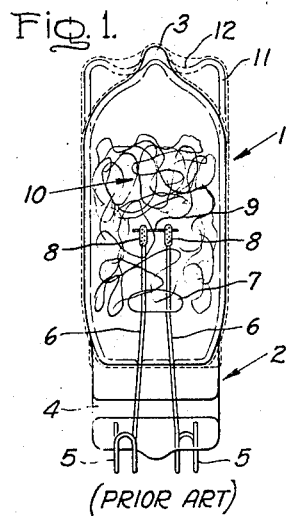
FIG. 1 is a front elevation view of a photoflash lamp of the prior art of the all-glass type known as the AG-1. The AG-3, a modification of the AG-1 in which the side walls of the lamp extend vertically upward further than in the AG-1 and are connected to the exhaust tip through a retroverted well portion, is shown in phantom outline in FIG. 1 to illustrate its differences from the AG-1.

It appears that an important means by which the present invention in certain of its embodiments allows the practical commercial production of smaller and higher performance photoflash lamps is by altering the predominant fracture mechanism of the glass upon flashing of the lamp while still permitting reliable seals to be made to the electrical inleads on high speed production equipment.

During the combustion process minute particles of combustion residues including metal oxide and molten metal such as zirconium oxide and zirconium metal are impinged against the inner surfaces of the lamp wall. The resulting thermal and mechanical shock normally lead to general laterally permeating fracture penetrating through the glass walls of tubular all-glass photoflash lamps of the AG-1, AG-3 and flashcube types of the prior art, and to a lesser extent, in similar lamps made according to the present invention. Cracks in the seal area may be even more deleterious to lamp performance. Zirconium combustible material and $ZrO_2$ are even more severe and more harmful to the glass envelope than aluminum and $Al_2O_3$, because of the higher melting point and lower volatility of $ZrO_2$. The same generally applies with other oxides melting at temperatures substantially above the melting point of aluminum oxide, such as above about 2200° C.

The borosilicate glasses chosen for use with the present invention lead to a different type of predominant failure mechanism of the glass than the 001 type lead glass normally used for all-glass photoflash lamps of the prior art. Without becoming committed to a particular theory, it is thought that the following is a feasible explanation of a possible apparent mechanism that could result in the improvements found in the present invention over the prior art.

Apparently, as the hot combustion product particles impinge upon the glass, the thermal conductivity of glass of the present invention is low enough and the elastic modulus and coefficient of thermal expansion are high enough to cause substantial amounts of ablation, spalling off, or shaling of the inner surface of the lamp at the points of impingement, relieving the thermal and mechanical stresses in the glass. However, the coefficient of thermal expansion is not so high as to cause excessive deleterious crack propagation penetrating through the lamp wall. If the thermal conductivity were too high, the heat could be diffused into the glass wall before the ablation with its accompanying stress relief could occur. The heat transfer characteristics of photoflash lamp walls are quite complex, being affected by both conduction and radiant heat; and the instantaneous profile of temperature across a lamp wall cannot be predicted with precision, particularly when localized effects of droplets of molten oxide must be considered. The elastic modulus determines the amount of stress that will be set up by a given strain caused by the thermal expansion of the glass. If the stress is high enough, it will cause fracture of the glass and preferably predominant or substantial amounts of fracture in the shaling mode rather than by crazing.

FIG. 1 shows photoflash lamps of the prior art. The lamp comprises a tubular glass wall indicated at 1. This wall forms part of the hermetically sealed envelope enclosing the operating parts of the lamp. A stem press base, indicated at 2, seals one end of the lamp and provides electrical contact means and handling means, while an exhaust tip 3 has been provided and closed at the other end of the lamp. The base portion includes a slot 4 along the sides of the lamp, useful in handling the lamp and locating it in a photoflash apparatus, and provides electrical contacts 5 formed of bent external portions of the lead wires 6. The lead wires 6 pass through the stem press base 2, and are preferably joined by a glass bead 7 within the lamp, which holds them rigidly. The inner ends of the leads are coated with photoflash primer 8, and have an electrical filament 9 connecting them. This filament may be provided as a fine tungsten wire, or preferably as a tungsten-rhenium alloy wire in accordance with Patent 3,123,993—Cressman and Demchock, assigned to the assignee of the present invention. The lamp is provided with a filling of filamentary or shredded zirconium foil, made generally in accordance with teachings of Patents 2,297,368 — Rippl and Isaac and 2,331,230—Rippl and Isaac, both assigned to the assignee of the present invention. Preferred zirconium shred cross sections for the invention are about 0.8 mil by 1.25 mils (0.0008 x 0.00125 inch), but other cross sections are suitable for making lamps of the invention. In accordance with the above-mentioned Anderson Patent 2,982,119, an oxygen gas filling is provided with a pressure of at least several atmospheres, such as 5 or 7 atmospheres. A preferred plastic encapsulation for lamps of the invention is cellulose acetate, and ignition primer materials are disclosed in Patent 2,756,577—R. M. Anderson, assigned to the assignee of the present invention.

Also shown in phantom outline in FIG. 1 is the upper end of the AG-3 photoflash lamp according to the above-mentioned Anderson Patent 3,304,750. Variations between the AG-1 lamp and the AG-3 lamp consist primarily in the shoulder 11 at the top of the lamp which provides greater internal volume with no increase in overall length. The formation of this shoulder 11 leaves between it and the sealing tip 3 a retroverted well 12.

Figure 2:
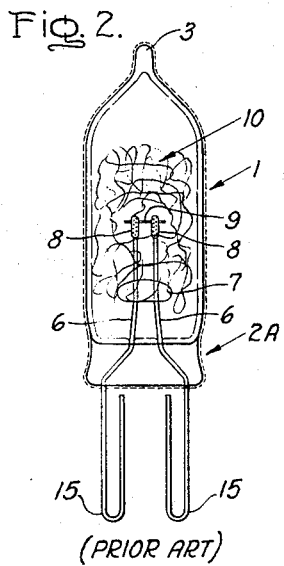
FIG. 2 is a front elevation view showing a flashcube lamp of the prior art.

The flashcube lamp of FIG. 2 is essentially the same as an AG-1 lamp except for the base construction. Since the electrical contacts in a flashcube are held firmly in place by a flashcube's plastic base which positions and holds four lamps, the form of the electrical contacts 5 and the stem press base 2 of the AG-1 lamp itself is not necessary. Thus, a flat press base 2A and longer electrical leads 15 shown in FIG. 2 are suitable for production of the flashcube lamp. As with the AG-3, the size, pressure, and loading of the flashcube lamp may vary from that of the traditional AG-1 lamp.

Figure 3:
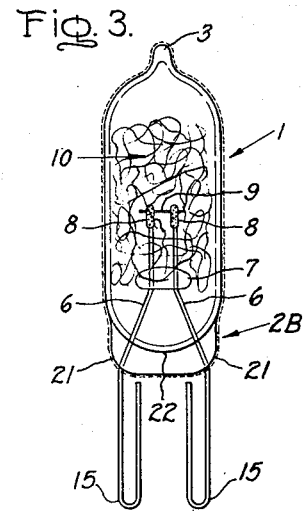
FIG. 3 is a front elevation view of a high performance flashcube lamp of the present invention with a preferred seal design in which the electrical inleads enter the lamp diagonally through glass of increased thickness at opposite corners of the bottom of the lamp.

FIG. 3 shows an embodiment of the present invention with a different base construction 2B in which electrical inleads 6 are sealed through the lamp envelope in opposite corners 21 of the end of the lamp opposite the exhaust tip 3, providing electrical contacts 15. This permits glass to be bunched at the corners 21 to provide a longer path through the lamp envelope for the inleads, which minimizes the likelihood of leakage and loss of hermetic seal, while the total added thickness of glass at the bottom of the lamp 22 is less than it would be otherwise for the same length of seal, thereby minimizing the overall length of the lamp.

Figure 4:
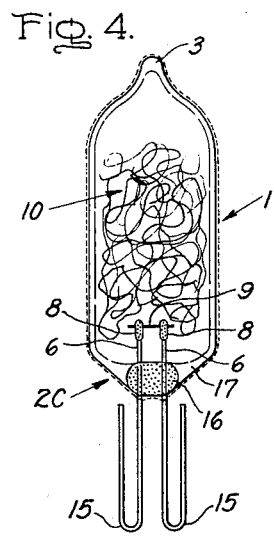
FIG. 4 is a front elevation view of a high performance flashcube lamp of the present invention with a different seal design including the mount bead directly forming part of the seal.

Photoflash lamps of the invention should be made without sharp stress-raising notches in the glass wall. Because the base through which the leads are sealed has traditionally been one of the more critical parts of the all-glass photoflash lamp, it is preferable for the seal to be made with a substantial mass of glass. One way to accomplish this, shown in FIG. 4, is to provide the lamp mount with a pressed powder bead 16 of the same glass as the envelope, fused around the lead wires 6, and then to fuse that bead into the end 17 of the lamp opposite the exhaust tip 3 to produce the lamp body with base construction 2C. When the bead is produced from glass powder, surface discontinuities in the bead can intercept initiating cracks and terminate their further propagation. It is desirable that the glass bead 16 be composed of a glass which seals well to the lead materials 6 and the glass of the envelope 1; preferably the bead is generally of the same glass composition as the envelope.

Lamps of FIG. 5 have been made according to the invention with about half the overall cross-sectional area and the same length as prior art flashcube lamps, but with about equivalent performance, as described below. Because of the size of these lamps, they are herein referred to as "half-cube" lamps. Of course, other lamps of the invention can be made in other sizes, shapes and proportions.

Lamps are preferably made in accordance with the present invention by the general teachings of the aforementioned Patent 3,188,162—Anderson and Demchock. Since procedures for making such lamps are well known in the art, and particularly are disclosed in that patent, hereby incorporated in this application by reference along with the other patents cited herein which pertain to the design and manufacture of all-glass photoflash lamps, the details of manufacturing procedures suitable for production of these lamps need not be repeated here. Other procedures may also be suitable for manufacturing such lamps.

As is well known in the art, an exhaust tip is not necessary at the end of the lamp opposite the electrical inleads, and metal exhaust tubes, for instance, can be provided, such as at the same end of the lamp as the electrical inleads. Also, with chamber exhaust techniques, photoflash lamps can be produced without exhaust tips or tubes.

Figure 5:
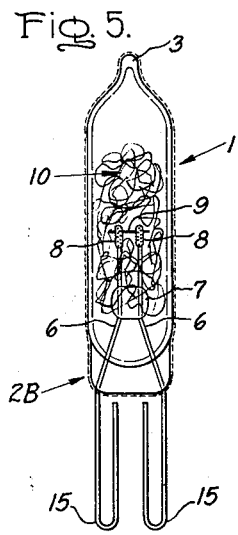
FIG. 5 is a front elevation view of a thinner lamp of the present invention known as a half-cube lamp.

Tests were performed on exemplary photoflash lamps made according to the present invention using glass type 7052 for the lamp envelope in accordance with FIGS. 3 and 5 and to the specifications of Table I. The light outputs for these lamps were, respectively, 14,700 and 13,000 lmsec./cc. These outputs range from 180% to 190% in lmsec./cc. relative to the highest previous values of commercial flashcube lamps.

| Parameter | Half-cube lamp | High performance cube lamp |
| --- | --- | --- |
| Foil (material) | Zirconium | Zirconium |
| Wt. in milligrams | 22 | 36 |
| Cut dimensions (in.) | 0.0008 × 0.00112 × 4 | 0.0008 × 0.00112 × 4 |
| Outside diameter (in.) | 0.255 | 0.310 |
| Inside diameter (in.) | 0.195 | 0.280 |
| Wall thickness (in.) | 0.030 | 0.030 |
| Internal volume (cubic centimeters) | 0.36 | 0.70 |
| Overall length (in.) | 1.0 | 1.0 |
| Oxygen fill (cubic centimeters referenced at 0° C. and 760 torr.) | 5.65 | 7.52 |

These lamps used a standard primer by weight of about 64% zirconium powder, 28% potassium perchlorate, and 8% magnesium powder, with about 0.002 gram per lamp, and used 0.0007 inch diameter tungsten-3% rhenium filament wire with about 0.055 inch between the electrical inleads. The lamps were coated with cellulose acetate about 0.009 inch thick. The oxygen content, specified as a percentage of that stoichiometrically required to combine with all the zirconium present, was about 100% for the half-cube lamp and 80% for the high performance cube lamp.

When half-cube and high performance cube lamps were made with 7052 glass and a large number were flashed, none failed to be contained by the plastic coating. When made with 001 lead glass, about 10% of the half-cube lamps were not contained, and 25% of the high performance lamps were not contained. This demonstrates the importance of using the glasses of the invention for highly loaded lamps.

The glass envelopes of essentially all modern high pressure photoflash lamps fracture when the lamps are flashed. The plastic layer used around the lamps generally holds the lamps together quite adequately for safety purposes, even if the glass fractures into many relatively small pieces. Normally, the glass does not fall apart but is held in place by the plastic, and the fractures do not crumble the glass or penetrate the plastic. As explained hereinabove, a difference in the mode or type of fracture of the glass envelope, along with the ability to make reliable seals between the glass and the electrical in-leads on a production basis, seems to be significant in obtaining the advantages of the present invention. However, the glass envelopes of even the lamps of the present invention generally do fracture. While the first mode of fracture seems to be localized and lateral along the inner surface of the glass envelope, causing small areas of the inner surface layer of glass to shale away from the inner envelope surface, this does make the remaining effective wall of the lamp even thinner, and fracture penetrating through the rest of the thickness of the lamp wall is quite likely and normally happens, although at a slightly later time.

The time, measured in milliseconds, at which the glass envelope of a photoflash lamp fractures is important. When the fracture occurs early, as the pressure and energy of the combustion is building up, the bulb will be more difficult to contain. The glass-plastic combination in lamps of the prior art are adequate to safely contain lamps of the prior art. However, to go to much higher loadings for much higher light output per unit volume, such materials of the prior art at some point become inadequate.

We have determined that fracture of the 001 type lead glass envelopes of standard commercial flashcube lamps occurs, as measured by a statistical distribution, in a large percentage of lamps, such as 50% or more, in less than about 40 milliseconds. If one attempted to load such otherwise standard lamps more heavily, to obatin higher light output, both figures would become much less favorable. Fracture would occur earlier, at a time of higher pressure, and would become unacceptable; similarly, the proportion of lamps failing early would increase. With the heavily loaded lamps made possible by the present invention, frequent fracture through the lamp wall in less than 40 milliseconds is undesirable and can be unacceptable under some circumstances. We have found that lamps of the present invention selected at random exhibit fracture of the glass through the lamp envelope, as detectable by noise with electronic instruments, in less than 100 milliseconds for fewer than 12% to 15% of the lamps. The time to fracture has been shifted substantially to longer times than for prior art lamps. The statistical nature of such a distribution means that few lamps would fracture in very much less than 100 milliseconds. This delay in fracture penetrating through the thickness of the lamp envelope wall is important in containing a heavily loaded lamp on flashing.

Glass 7740, which is the glass normally referred to as Pyrex, and other similar glasses, when made into photoflash lamps of the type described herein, do not yield an acceptable product because of unacceptably high percentages of failures in the seal areas resulting from strains caused by mismatch of glass and electrical inlead materials. Also, glasses containing substantial amounts of PbO such as Nonex-Glass 7720 react with iron-containing inlead wires during sealing, producing bubbles and unacceptable leaky seals.

Although more sensitive instruments will detect noise of glass fracture penetrating through the lamp wall with greater precision and resolution, we have found that, so long as the instruments are capable of detecting some noise on flashing, this is the noise of the penetrating glass fracture. A Sound Level Meter manufactured by General Radio Corporation can be used effectively for such tests. Probably because of muffling of the sound and delay in the speed of sound transmission, we have not detected with this instrument any noise definitely associated with the combustion itself, with the impact of molten oxides on the lamp wall, or with shaling, but have first detected only noise apparently associated with the penetration of cracks through the thickness of the glass envelope.

Thus, the present invention permits the manufacture of photoflash lamps with substantially higher light output, without sacrificing product safety. Materials for lamp construction to achieve these ends have been specified, and the mechanisms by which improvements constituting differences of kind, along with statistical measurements of the effects, have also been specified.

The foregoing is a description of illustrative embodiments of the invention, and it is applicant's intention in the appended claims to cover all forms which fall within the scope of the invention.

What we claim as new and desire to secure by Letters Patent of the United States is:

1. A photoflash lamp having a volume of less than about two cubic centimeters and comprising: a hermetically sealed envelope, and, within said envelope ignition means, an oxidizing atmosphere at a pressure of at least several atmospheres, and filamentary combustible metallic material, said filamentary combustible metallic material having an oxide with a melting point above about 2200° C., wherein the improvements comprise:

the envelope of said lamp being composed of a glass consisting essentially of the folowing constituents in about the ranges stated by weight: 60 to 75% $SiO_2$, 10 to 25% $B_2O_3$, 1 to 10% $Al_2O_3$, 4 to 10% total alkali oxides, and 0 to 5% BaO, except for incidental impurities and residual fluxes and refining agents, and having a mean coefficient of linear thermal expansion between 0 and 300° C. about in the range of 40 to $50 \times 10^{-7}$ per ° C.

2. A photoflash lamp according to claim 1 which has a light output of at least about 12,500 lumen-seconds per cubic centimeter of internal lamp volume.

3. A photoflash lamp according to claim 1 in which
at least one electrical inlead is provided through said envelopes, said inlead being composed of an alloy consisting essentially of iron, nickel and cobalt, and optionally containing minor amounts of manganese, and
a strong, hermetic seal is provided between said glass and said electrical inlead.

4. A photoflash lamp according to claim 3 in which
said electrical inlead alloy consists essentially of the following constituents in about the ranges stated by weight: 27 to 32% Ni, 14 to 19% Co, less than 1.0% Mn, the balance iron, except for incidental impurities.

5. A photoflash lamp according to claim 1 in which
said atmosphere is essentially oxygen at a pressure of at least about eight atmospheres,
the filamentary combustible material is predominantly zirconium,
said photoflash lamp contains at least about 45 milligrams of filamentary zirconium metal per cubic centimeter of the internal volume of said lamp, and
said photoflash lamp has a light output of at least about 12,500 lumen-seconds per cubic centimeter of internal lamp volume.

6. A photoflash lamp according to claim 1 in which
said glass is selected so that a substantial mode of fracture of the glass envelope on flashing of said photoflash lamp is by spalling off of layers of parts of the internal surface of said glass envelope at the loci of impingement of hot combustion residues, thereby delaying the penetration of cracks through the thickness of said glass envelope, and said delay in penetration of cracks through the thickness of said glass envelope is sufficient relative to instantaneous glass pressure in said lamp so that, on a statistical basis, a random selection of said photoflash lamps produces detectable noise caused by said penetrating glass fracture upon flashing of the lamp in less than 100 milliseconds for no more than 15% of the lamps in said random selection.

7. A photoflash lamp according to claim 1 in which said glass contains the following constituents in about the ranges stated by weight: 60 to 75% silica, 14 to 22% boric oxide, 3 to 9% alumina, 4 to 10% total alkali oxides, and 0 to 5% barium oxide, and having a mean coefficient of linear thermal expansion between 0 and 300° C. about in the range of 45 to $50 \times 10^{-7}$ per ° C., and said glass is selected so that a substantial mode of fracture of the glass envelope on flashing of said photoflash lamp is by spalling off of layers of parts of the internal surface of said glass envelope at the loci of impingement of combustion residues, thereby delaying the penetration of cracks through the thickness of said glass envelope.

8. A photoflash lamp according to claim 1 in which said glass contains the following constituents in about the ranges stated by weight: 60 to 65% $SiO_2$, 19 to 23% $B_2O_3$, 8 to 9% $Al_2O_3$, 2 to 4% BaO, and 4.5 to 5.5% total alkali oxides.

9. A photoflash lamp according to claim 1 in which said glass contains the following constituents in about the ranges stated by weight: 68 to 73% $SiO_2$, 13 to 17% $B_2O_3$, 2 to 4.5% $Al_2O_3$, 7 to 9% total alkali oxides, and 0 to 2% BaO.

10. A photoflash lamp according to claim 1 in which at least one electrical inlead is provided through said envelope sealed through a pressed powder glass preform which has been fused to said inleads and to said glass envelope, thereby forming a smooth fusion seal without substantial sharp notch stress raisers.

11. A photoflash lamp according to claim 1 in which said atmosphere is essentially oxygen at a pressure of at least about eight atmospheres, the filamentary combustible material is predominantly zirconium, said photoflash lamp contains at least about 45 milligrams of filamentary zirconium metal per cubic centimeter of the internal volume of said lamp, said photoflash lamp has a light output of at least about 12,500 lumen-seconds per cubic centimeter of internal lamp volume, at least one electrical inlead is provided through said envelopes, said inlead being composed of an alloy consisting essentially of iron, nickel and cobalt, and optionally containing minor amounts of manganese, and a strong, hermetic seal is provided between said glass and said electrical inlead.

References Cited
UNITED STATES PATENTS

| | | | |
|---|---|---|---|
| 2,865,186 | 12/1958 | Anderson | 431—93 |
| 3,263,457 | 8/1966 | Reiber | 431—95 |

EDWARD J. MICHAEL, Primary Examiner

U.S. Cl. X.R.

106—62